United States Patent
BenHanokh et al.

(10) Patent No.: US 12,292,822 B1
(45) Date of Patent: May 6, 2025

(54) OPTIMIZING MEMORY ACCESS FOR SYSTEM WITH MEMORY EXPANDER

(71) Applicant: International Business Machines Corporation, Armonk, NY (US)

(72) Inventors: Gabriel Zvi BenHanokh, Tel Aviv (IL); Brett Niver, Whitinsville, MA (US); Yuval Lifshitz, Kfar HaOranim (IL); Yehoshua Salomon, Kfar Saba (IL)

(73) Assignee: International Business Machines Corporation, Armonk, NY (US)

( * ) Notice: Subject to any disclaimer, the term of this patent is extended or adjusted under 35 U.S.C. 154(b) by 8 days.

(21) Appl. No.: 18/409,867

(22) Filed: Jan. 11, 2024

(51) Int. Cl.
*G06F 12/02* (2006.01)

(52) U.S. Cl.
CPC .................. *G06F 12/023* (2013.01)

(58) Field of Classification Search
CPC .................................................. G06F 12/023
See application file for complete search history.

(56) References Cited

U.S. PATENT DOCUMENTS

| 2005/0027953 | A1* | 2/2005 | McIntosh | G06F 8/4442 711/158 |
| 2018/0165209 | A1* | 6/2018 | Poxon | G06F 12/023 |
| 2022/0137864 | A1 | 5/2022 | Lee | |

OTHER PUBLICATIONS

Anonymous, "Documentation for /proc/sys/kernel/," URL: https://www.kernel.org/doc/html/latest/admin-guide/sysctl/kernel.html#numa-balancing; Retrieved: Dec. 15, 2023; 30 pages.

(Continued)

*Primary Examiner* — Jason W Blust
(74) *Attorney, Agent, or Firm* — CANTOR COLBURN LLP; Edward Wixted

(57) ABSTRACT

Computer-implemented methods for optimizing memory access for systems with memory expanders are provided. Aspects include analyzing a source code of a program to identify each data structure that will be accessed by the program during execution of the program, determining a predicted access pattern for each data structure, and determining a type of each data structure. Aspects also include calculating a data access score for each data structure based at least in part on the predicted access pattern and the type and creating an executable code of the program based on the source code. The executable code includes a memory allocation value for each data structure that is determined based on the data access score for each data structure.

20 Claims, 4 Drawing Sheets

(56) References Cited

OTHER PUBLICATIONS

Anonymous, "Fundamental Memory Regions," Khronos® OpenCL Working GroupVersion V3.0.15; Dec. 14, 2023; URL: https://registry.khronos.org/OpenCL/specs/3.0-unified/html/OpenCL_API.html#_fundamental_memory_regions; Retrieved: Dec. 15, 2023; 3 pages.

Arif et al., "Exploiting CXL-based Memory for Distributed Deep Learning," ICPP '22, Aug. 29-Sep. 1, 2022, 11 pages.

Berger et al., "Design Tradeoffs in CXL-Based Memory Pools for Public Cloud Platforms," IEEE Micro; Feb. 2023; vol. 43(2); pp. 30-38.

Ha et al., "Dynamic Capacity Service for Improving CXL Pooled Memory Efficiency," IEEE Micro, Mar./Apr. 2023, pp. 39-47.

Li et al., "First-generation Memory Disaggregation for Cloud Platforms," arXiv:2203.00241v1 [cs.OS] Mar. 1, 2022, 16 pages.

Li et al. "Pond: CXL-based memory pooling systems for cloud platforms." Proceedings of the 28th ACM International Conference on Architectural Support for Programming Languages and Operating Systems, vol. 2. (2023): pp. 574-587.

Maruf et al., "TPP: Transparent Page Placement for CXL-Enabled Tiered-Memory," arXiv:2206.02878v2 [cs.DC] May 28, 2023, 14 pages.

\* cited by examiner

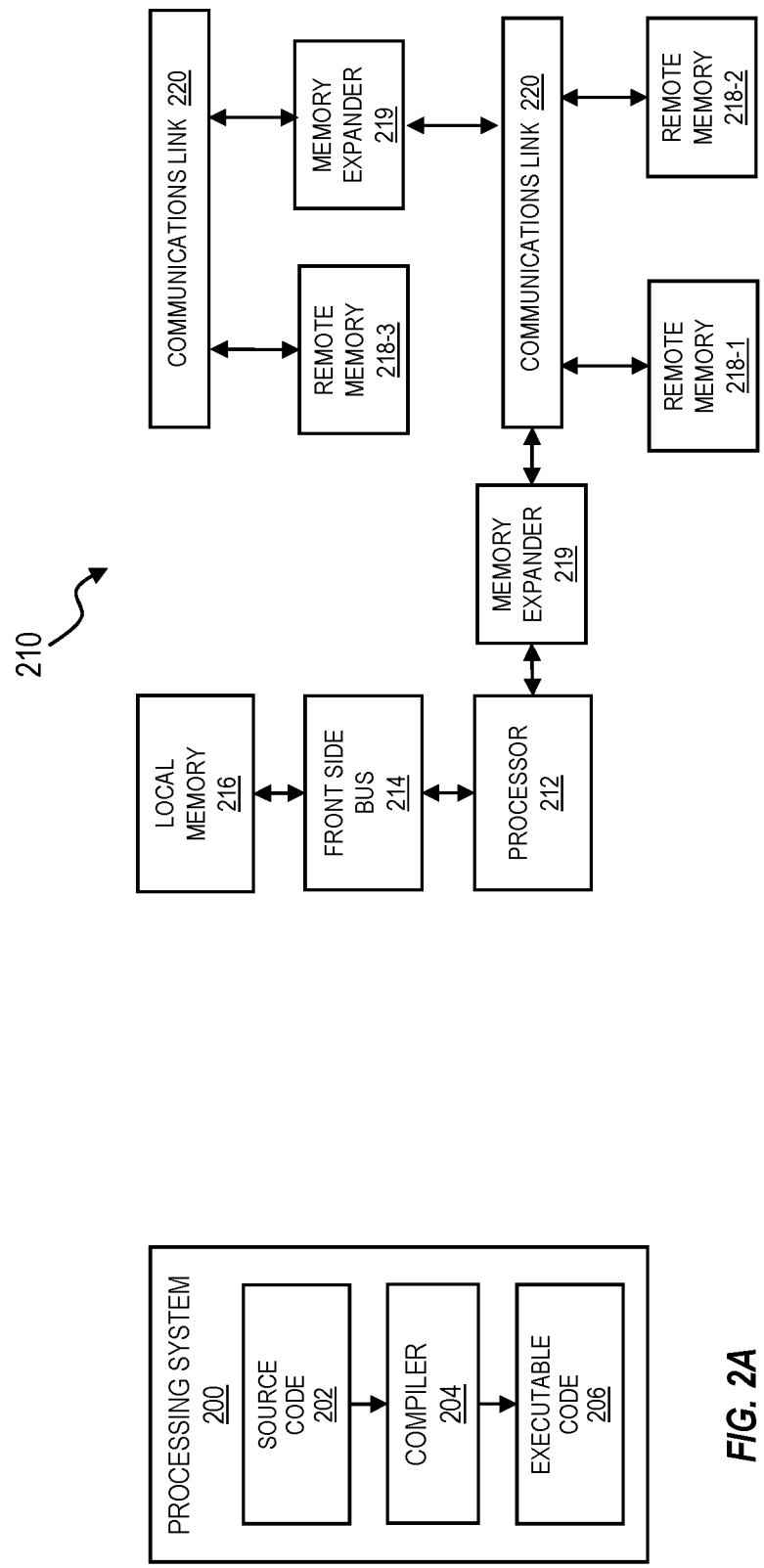

ANALYZE A SOURCE CODE OF A PROGRAM TO IDENTIFY EACH DATA STRUCTURE THAT WILL BE ACCESSED BY THE PROGRAM DURING EXECUTION OF THE PROGRAM 302

→ DETERMINE ONE OR MORE OF A PREDICTED ACCESS PATTERN, A TYPE, AND A PREDICTED SIZE FOR EACH DATA STRUCTURE 304

→ CALCULATE A DATA ACCESS SCORE FOR EACH DATA STRUCTURE BASED AT LEAST IN PART ON ONE OR MORE OF THE PREDICTED ACCESS PATTERN, THE TYPE AND THE PREDICTED SIZE 306

→ CREATE AN EXECUTABLE CODE OF THE PROGRAM BASED ON THE SOURCE CODE, WHERE THE EXECUTABLE CODE INCLUDES A MEMORY ALLOCATION VALUE FOR EACH DATA STRUCTURE THAT IS DETERMINED BASED ON THE DATA ACCESS SCORE FOR EACH DATA STRUCTURE 308

*FIG. 3*

OPTIMIZING MEMORY ACCESS FOR SYSTEM WITH MEMORY EXPANDER

BACKGROUND

The present disclosure generally relates to data storage systems, and more specifically, to optimizing memory access for systems with memory expanders.

Core counts on central processing units (CPUs) are expanding faster than memory bandwidth creating a widening gap between the performance of the processing cores and the memory modules that supply data to the processing cores. In addition, the memory attached to the CPU is shared between all processing cores on the CPU, which is growing faster than the capacity of memory added to a CPU.

As a result of the decreasing memory capacity available to CPUs, memory expanders, such as Compute Express Link (CXL) expanders, have been developed to, among other things, increase the memory capacity available to the CPU. While memory expanders have added additional memory capacity and bandwidth available to the CPU, the memory latency of memory devices accessed via the memory expanders is greater that memory devices directly by the processor and might vary depending on the implementation, distance and the memory type used.

SUMMARY

Embodiments of the present disclosure are directed to computer-implemented methods for optimizing memory access for systems with memory expanders. The computer-implemented method includes analyzing a source code of a program to identify each data structure that will be accessed by the program during execution of the program, determining a predicted access pattern for each data structure, and determining a type of each data structure. The method also includes calculating a data access score for each data structure based at least in part on the predicted access pattern and the type and creating an executable code of the program based on the source code. The executable code includes a memory allocation value for each data structure that is determined based on the data access score for each data structure.

Embodiments also include computing systems and computer program products for storing data with replicated metadata in a scale-out data storage system.

Additional technical features and benefits are realized through the techniques of the present disclosure. Embodiments and aspects of the disclosure are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the present disclosure are apparent from the following detailed description taken in conjunction with the accompanying drawings in which:

FIG. 2A is a block diagram of a processing system for creating executable code for use in optimizing memory access in a system with memory expanders in accordance with one or more embodiments of the present disclosure;

FIG. 2B is a block diagram of a system having memory expanders in accordance with one or more embodiments of the present disclosure;

FIG. 3 is a flowchart of a method for creating executable code for use in optimizing memory access in a system with memory expanders in accordance with one or more embodiments of the present disclosure.

DETAILED DESCRIPTION

Figure 1:
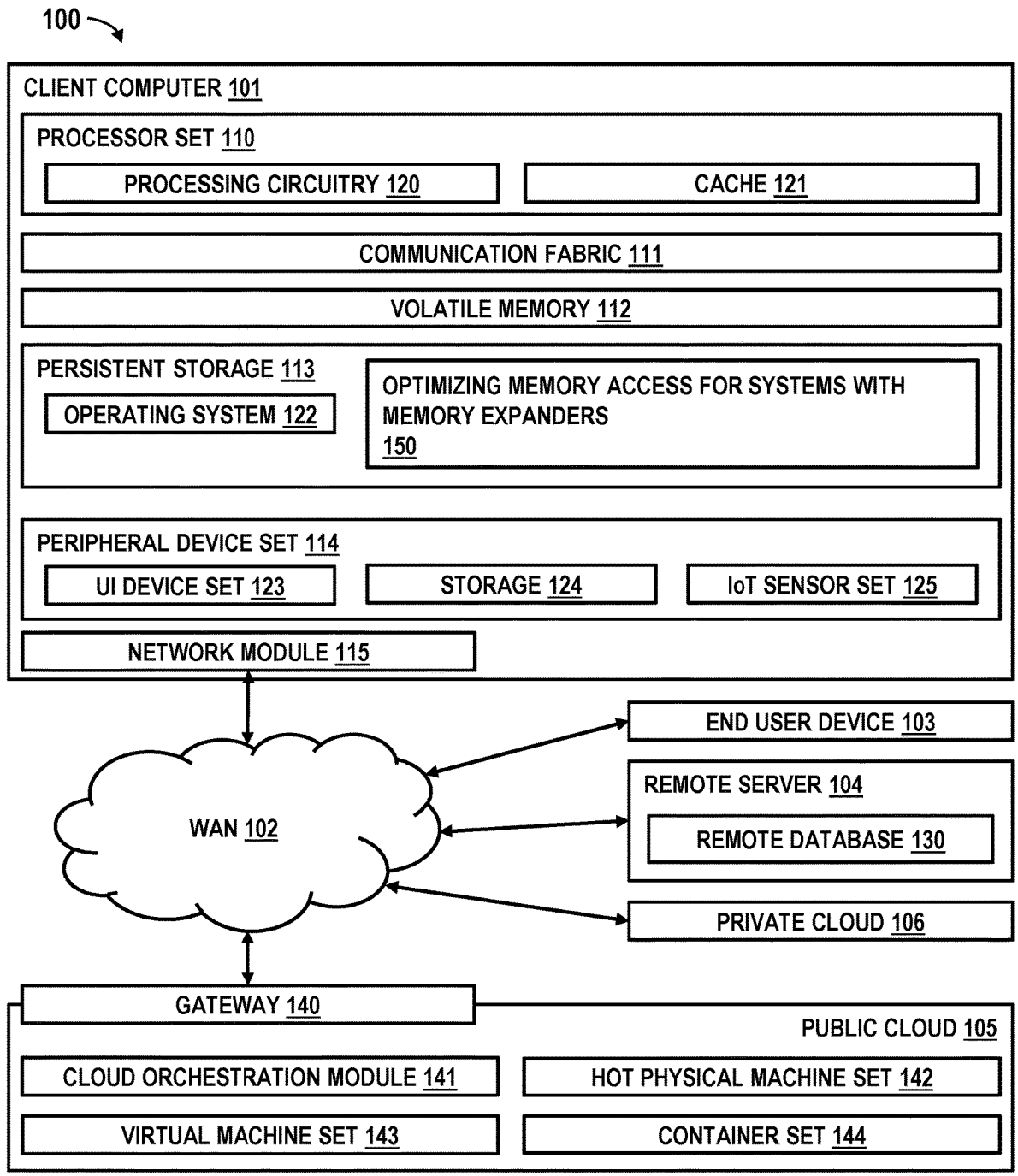
FIG. 1 is a block diagram of an example computer system for use in conjunction with one or more embodiments of the present disclosure.

As discussed in more detail above, memory expanders have been developed to increase the memory capacity available to CPUs. While memory expanders have successfully increased the memory capacity and bandwidth available to the CPU, the memory latency of memory devices accessed via the memory expanders is significantly larger than memory devices accessed via a memory controller attached directly to the CPU. Accordingly, it is desirable to develop methods and systems for a processor to utilize the added memory capacity and bandwidth without stalling the processor, which operates at a speed that is a few orders of magnitude faster than the memory, and that every hop on the expander makes the memory even slower.

In exemplary embodiments, methods, systems, and computer program products for optimizing memory access for systems with memory expanders are provided. In exemplary embodiments, during the creation of executable code from a source code of a program, a compiler is configured to analyze data structures that will be accessed by the program and to calculate a data access score for each data structure, where the data access score reflects the stalling impact of the data structures. In one example, the data access score may range from one to one hundred with a lower data access score indicating that the data structure has a high stalling impact and a higher data access score indicating that the data structure has a lower stalling impact.

In exemplary embodiments, the compiler is further configured to set a memory allocation value for each data structure that will be accessed by the program based on the calculated data access score for each data structure. In various embodiments, different values of data access scores are mapped to different memory allocation values based, at least in part, on the size of the memory allocation value, i.e., the number of bits of the memory allocation value. In general, the memory allocation value is a positive integer ranging between one and N. In this example, a memory allocation value of one indicates that the stalling impact of the data structure is high and that the allocation should be made at a memory location having the lowest possible latency, such as a local memory device. The memory allocation value of one may correspond to a data access score between one and twenty-five. In another example, a memory allocation value of N indicates that the stalling impact of the data structure is low and that the allocation can be made at a memory location having the highest possible latency. The memory allocation value of N may correspond to a data access score between seventy-six and one hundred.

In exemplary embodiments, memory allocation values are utilized by a processor to determine an appropriate memory location for allocating memory requested by an executable code of a program. In exemplary embodiments, the processor is configured to obtain the memory allocation value for a requested memory allocation, to identify a plurality of potential storage locations, and to determine a latency score of each of the plurality of potential storage locations. The processor is further configured to select one of the plurality of potential storage locations based at least in part on the memory allocation value and the latency score of the plurality of potential storage locations. In exemplary embodiments, the processor is further configured to select one of the plurality of potential storage locations based on other criteria such as a type or memory access requested (i.e., foreground vs. background access), a request allocation size, a priority score associated with the program requesting the memory access, or the like.

Various aspects of the present disclosure are described by narrative text, flowcharts, block diagrams of computer systems, and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as optimizing memory access for systems with memory expanders 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collects and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105.

The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

One or more embodiments described herein can utilize machine learning techniques to perform prediction and or classification tasks, for example. In one or more embodiments, machine learning functionality can be implemented using an artificial neural network (ANN) having the capability to be trained to perform a function. In machine learning and cognitive science, ANNs are a family of statistical learning models inspired by the biological neural networks of animals, and in particular the brain. ANNs can be used to estimate or approximate systems and functions that depend on a large number of inputs. Convolutional neural networks (CNN) are a class of deep, feed-forward ANNs that are particularly useful at tasks such as, but not limited to analyzing visual imagery and natural language processing (NLP). Recurrent neural networks (RNN) are another class of deep, feed-forward ANNs and are particularly useful at tasks such as, but not limited to, unsegmented connected handwriting recognition and speech recognition. Other types of neural networks are also known and can be used in accordance with one or more embodiments described herein.

ANNs can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons that can be activated by the pixels of an input image. After being weighted and transformed by a function determined by the network's designer, the activation of these input neurons are then passed to other downstream neurons, which are often referred to as "hidden" neurons. This process is repeated until an output neuron is activated. The activated output neuron determines which character was input. It should be appreciated that these same techniques can be applied in the case of containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Referring now to FIG. 2A, a block diagram of a processing system 200 for creating executable code 206 for use in optimizing memory access in a system with memory expanders in accordance with one or more embodiments of the present disclosure is shown. In exemplary embodiments, the processing system 200 may be embodied in a computer 101, such as the one shown in FIG. 1. As illustrated, the processing system 200 includes a complier 204 that is configured to receive a source code 202 and to responsively create an executable code 206 for a computer program.

In exemplary embodiments, the compiler 204 is configured to analyze the source code 202 of a program and to identify all data structures that the program will utilize during execution. Once the compiler 204 identifies all of the data structures that the program will utilize during execution, the compiler 204 is further configured to determine one or more of the predicted access pattern for each data structure and the type of each data structure. Based on one or more of the predicted access pattern, the type, and the predicted size, the complier 204 is configured to calculate a data access score for each data structure. In exemplary embodiments, the compiler 204 is further configured to calculate the data access score for each data structure based on a predicted size for each data structure, based on a determination that a predicted size for each data structure is available. In a predicted size for each data structure is not available, the compiler 204 may use an estimate for the predicted size for each data structure.

In exemplary embodiments, the data access score indicates the stalling impact of the data structure on the program. In one embodiment, the data access score is inversely correlated with the stalling impact of the data structure on the program. The compiler 204 is further configured to create the executable code 206 of the program based on the source code 202, where the executable code includes a memory allocation value for each data structure. In exemplary embodiments, the memory allocation value for each data structure is determined based on the data access score for each data structure.

In one example, the data access score may range from one to M with a lower data access score indicating that the data structure has a high stalling impact and a higher data access score indicating that the data structure has a lower stalling impact. In one example, the memory allocation value ranges from one to N. In this example, a memory allocation value of one indicates that the stalling impact of the data structure is high and that the allocation should be made at a memory location having the lowest possible latency, such as a local memory device. The memory allocation value of one may correspond to a data access score between one and M/N. In another example, a memory allocation a value of N indicates that the stalling impact of the data structure is low and that the allocation can be made at a memory location having the highest possible latency. The memory allocation value of N may correspond to a data access score between (M-M/N) and M. In exemplary embodiments, a machine learning model can be trained to understand the memory access patterns used by applications and can be used by the compiler 204 to the methods for calculating memory allocation scores based on running history.

In exemplary embodiments, the predicted access pattern for each data structure can be determined by the compiler 204 based on an analysis of the source code 202. The access patterns can include single-read accesses, such as retrieving a single record or a small set of records from a memory location. The access patterns can also include bulk read accesses, such as retrieving a large set of records in a single operation. The access patterns can also include sequential read accesses, such as retrieving data in a sequential order, typically for processing data in batches. The access patterns can also include random read accesses, such as accessing data at random positions without a specific order. The access patterns can also include pagination accesses, such as retrieving a specific number of records at a time, allowing for paginated display. The access patterns can also include search accesses, such as performing a search operation to find records that match specific criteria. The access patterns can also include filtering accesses, such as retrieving records based on specific filters or conditions.

In exemplary embodiments, the type of each data structure can be determined by the compiler 204 based on an analysis of the source code 202. In exemplary embodiments, the type of each data structure can include but is not limited to, arrays, linked lists, stacks, search, trees, graphs, hash tables, B-trees, and the like.

In exemplary embodiments, the predicted size for each data structure can be determined by the compiler 204 based on an analysis of the source code 202. In one embodiment, the compiler 204 may determine the predicted size for a data structure based on variable types, array dimensions, and data structures. For example, if the size of an array is determined by a constant or a known variable, the compiler 204 can calculate the total size. In another embodiment, the compiler 204 may determine the predicted size for a data structure using type information to determine the size of data structures, including structs and classes, based on the size of their members. In another embodiment, the compiler 204 may determine the predicted size for a data structure by performing a data flow analysis to track the values of variables and expressions throughout the program, helping in the estimation of memory sizes. For example, if the size of an allocation is dependent on a variable whose value is known at a certain point, the compiler can use this information. In another embodiment, the compiler 204 may determine the predicted size for a data structure using array bounds checking, that is if array bounds are known at compile time or through analysis, the compiler 204 can use this information to determine the size of memory allocations.

In one embodiment, the large memory buffers accessed via direct memory access have a low stalling impact and therefore would be assigned a low memory access score. Likewise, sequential memory accesses where a prefetch mechanism could reduce the impacts of a higher latency would be assigned a low memory access score. As a result, such memory allocations can be placed on memory devices accessed by the processor via a memory expander, such as a CXL expander.

In one embodiment, random memory access, such as obtaining data stored in a hash-table or in a search-tree data-structure have a high stalling impact and therefore would be assigned a high memory access score. As a result, such memory allocations should be placed on local memory devices accessed by the processor via a conventional memory controller.

Referring now to FIG. 2B, a block diagram of a system 210 having memory expanders 219 in accordance with one or more embodiments of the present disclosure is shown. As illustrated, the system 210 includes a processor 212 that is configured to execute an executable code 206 for a program. The processor 212 utilizes a front-side bus 214 to communicate with local memory 216 and with a memory expander 219. In one embodiment, the memory expander 219 is a Compute Express Link (CXL) expander. The memory expander 219 is configured to communicate with a number of devices via a communications link 220, such as a CXL link. In exemplary embodiments, the devices connected to the communications link 220 can include memory devices 218 and additional memory expanders 219. In exemplary embodiments, each of the memory devices 218-1, 218-2, and 218-3, collectively referred to herein as memory devices 218, have an associated latency score that is determined based on the location of the memory device 218 and the type of the memory device.

In exemplary embodiments, during the execution of the executable code 206 of a program by the processor 212, the processor is configured to identify a request for a memory allocation for a data structure in the executable code 206. In response to the request, the processor 212 is configured to obtain the memory allocation value for the data structure associated with the request. In addition, the processor 212 is configured to identify a plurality of potential storage locations in the memory devices 218 for the data structure and the latency score of each of the memory devices 218. Next, the processor 212 selects one of the potential storage locations based at least in part on the memory allocation value and the latency score of the memory devices 218. The selected memory location is then allocated to the data structure.

In exemplary embodiments, the processor 212 may also be configured to select one of the potential storage locations based on the based on a predicted size of the memory structure and the available storage capacity of the various memory devices 218. Furthermore, the 212 may also be configured to select one of the potential storage locations based on other criteria such as a type or memory access requested (i.e., foreground vs. background access), a request allocation size, a priority score associated with the program requesting the memory access, or the like. In one embodiment, each program (i.e., each executable code) has an associated priority score and the processor 212 configured to select one of the potential storage locations based on the priority score such that executable code associated with a higher priority score is allocated memory locations that have a lower latency score.

Referring now to FIG. 3, a flowchart of a method 300 for creating executable code for use in optimizing memory access in a system with memory expanders in accordance with one or more embodiments of the present disclosure is shown. In exemplary embodiments, the method 300 is performed by a compiler 204 such as the one shown in FIG. 2A. As shown at block 302, the method 300 includes analyzing a source code of a program to identify each data structure that will be accessed by the program during execution of the program. Next, as shown at block 304, the method 300 includes determining one or more of a predicted access pattern for each data structure, a type for each data structure, and a predicted size for each data structure.

Continuing with reference to FIG. 3, the method 300 includes calculating a data access score for each data structure based at least in part on one or more of the predicted access pattern, the type, and the predicted size, as shown at block 306. In one embodiment, the data access score indicates the stalling impact of the data structure on the program. In one embodiment, the data access score is inversely correlated with the stalling impact of the data structure on the program.

The compiler 204 is further configured to create the executable code 206 of the program based on the source code 202, where the executable code includes a memory allocation value for each data structure. In exemplary embodiments, the memory allocation value for each data structure is determined based on the data access score for each data structure. In exemplary embodiments, a machine learning model can be trained to understand the memory access patterns used by applications and can be used by the compiler 204 to the methods for calculating memory allocation scores based on running history. Next, as shown at block 308, the method 300 includes creating an executable code of the program based on the source code, where the executable code includes a memory allocation value for each data structure that is determined based on the data access score for each data structure.

In one embodiment, the memory allocation value is a positive integer between one and N. In one example, a memory allocation value of one indicates that the stalling impact of the data structure is high and that the allocation should be made at a memory location having the lowest possible latency, such as a local memory device. In another example, a memory allocation value of N indicates that the stalling impact of the data structure is low and that the allocation can be made at a memory location having the highest possible latency.

Figure 4:
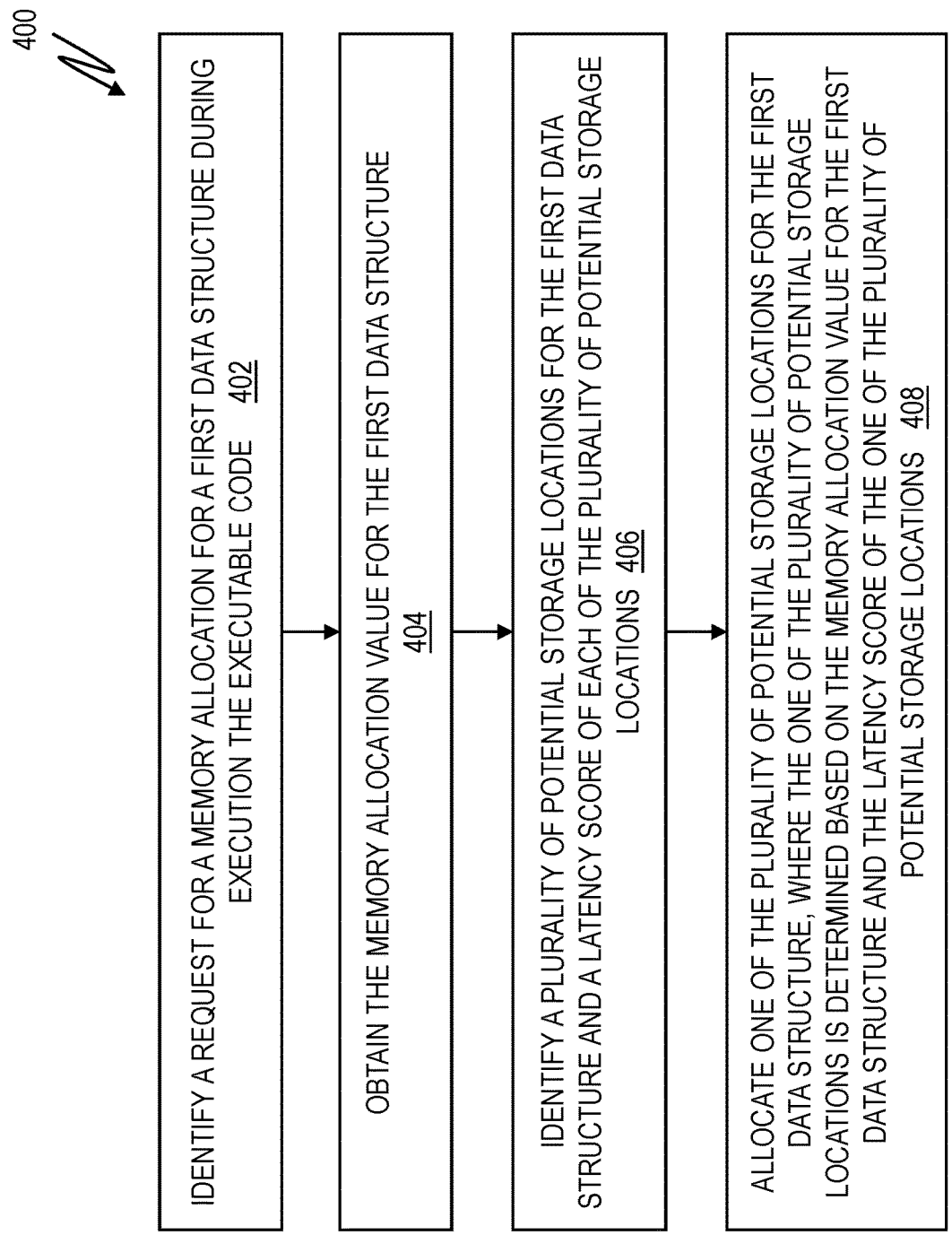
FIG. 4 is a flowchart of a method for optimizing memory access for systems with memory expanders in accordance with one or more embodiments of the present disclosure.

Referring now to FIG. 4, a flowchart of a method 400 optimizing memory access for systems with memory expanders in accordance with one or more embodiments of the present disclosure is shown. In exemplary embodiments, the method 400 is performed by a processor 212 such as the one shown in FIG. 2B. As shown at block 402, the method 400 includes identifying a request for a memory allocation for a first data structure during the execution the executable code. Next, as shown at block 404, the method 400 includes obtaining the memory allocation value for the first data structure. The method 400 also includes identifying a plurality of potential storage locations for the first data structure and a latency score of each of the plurality of potential storage locations, as shown at block 406. In exemplary embodiments, the plurality of potential storage locations are identified based at least in part based on a predicted size of the first data structure and based on the available capacity of the various memory devices available to the processor.

Continuing with reference to FIG. 4, the method 400 includes allocating one of the plurality of potential storage locations for the first data structure. In exemplary embodiments, the one of the plurality of potential storage locations is determined based on the memory allocation value for the first data structure and the latency score of the one of the plurality of potential storage locations. In exemplary embodiments, a higher memory allocation value for the first data structure will result in the allocation of the one of the plurality of potential storage locations having a higher latency. Likewise, a lower memory allocation value for the first data structure will result in the allocation of the one of the plurality of potential storage locations having a lower latency.

Various embodiments are described herein with reference to the related drawings. Alternative embodiments can be devised without departing from the scope of the present disclosure. Various connections and positional relationships (e.g., over, below, adjacent, etc.) are set forth between elements in the following description and in the drawings. These connections and/or positional relationships, unless specified otherwise, can be direct or indirect, and the present disclosure is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well-known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the present disclosure may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method for optimizing memory access for systems with memory expanders, the method comprising:
    analyzing a source code of a program to identify each data structure that will be accessed by the program during execution of the program;
    determining a predicted access pattern for each data structure;
    determining a type of each data structure;
    calculating a data access score for each data structure based at least in part on the predicted access pattern and the type;
    creating an executable code of the program based on the source code,
    wherein the executable code includes a memory allocation value for each data structure,
    wherein the memory allocation value for each data structure is determined based on the data access score for each data structure, and
    wherein the memory allocation value is utilized by a processor to determine a memory location for allocating memory requested during execution of the program.

2. The method of claim 1, wherein the memory allocation value indicates a memory location for storing the data structure during execution of the executable code.

3. The method of claim 1, further comprising determining a predicted size for each data structure and wherein the data access score for each data structure is further based on the predicted size for each data structure.

4. The method of claim 1, further comprising:
    based on identifying a request for a memory allocation for a first data structure during execution the executable code:
        obtaining the memory allocation value for the first data structure;
        identifying a plurality of potential storage locations for the first data structure;
        identifying a latency score of each of the plurality of potential storage locations; and
        allocating one of the plurality of potential storage locations for the first data structure, wherein the one of the plurality of potential storage locations is determined based on the memory allocation value for the first data structure and the latency score of the one of the plurality of potential storage locations.

5. The method of claim 4, wherein the one of the plurality of potential storage locations is further determined based on a priority level associated with the executable code.

6. The method of claim 4, wherein the one of the plurality of potential storage locations is further determined based on an available storage capacity of a memory device associated with each of the plurality of potential storage locations.

7. The method of claim 4, wherein a higher value of the memory allocation value for the first data structure will result in the allocation of the one of the plurality of potential storage locations having a higher latency.

8. A computing system having a memory having computer readable instructions and one or more processors for executing the computer readable instructions, the computer readable instructions controlling the one or more processors to perform operations comprising:
    analyzing a source code of a program to identify each data structure that will be accessed by the program during execution of the program;
    determining a predicted access pattern for each data structure;
    determining a type of each data structure;

calculating a data access score for each data structure based at least in part on the predicted access pattern and the type;

creating an executable code of the program based on the source code, wherein the executable code includes a memory allocation value for each data structure, and wherein the memory allocation value for each data structure is determined based on the data access score for each data structure, and wherein the memory allocation value is utilized by a processor to determine a memory location for allocating memory requested during execution of the program.

9. The computing system of claim 8, wherein the memory allocation value indicates a memory location for storing the data structure during execution of the executable code.

10. The computing system of claim 8, wherein the operations further comprise determining a predicted size for each data structure and wherein the data access score for each data structure is further based on the predicted size for each data structure.

11. The computing system of claim 8, wherein the operations further comprise:

based on identifying a request for a memory allocation for a first data structure during execution the executable code:
  obtaining the memory allocation value for the first data structure;
  identifying a plurality of potential storage locations for the first data structure;
  identifying a latency score of each of the plurality of potential storage locations; and
  allocating one of the plurality of potential storage locations for the first data structure, wherein the one of the plurality of potential storage locations is determined based on the memory allocation value for the first data structure and the latency score of the one of the plurality of potential storage locations.

12. The computing system of claim 11, wherein the one of the plurality of potential storage locations is further determined based on a priority level associated with the executable code.

13. The computing system of claim 11, wherein the one of the plurality of potential storage locations is further determined based on an available storage capacity of a memory device associated with each of the plurality of potential storage locations.

14. The computing system of claim 11, wherein a higher value of the memory allocation value for the first data structure will result in the allocation of the one of the plurality of potential storage locations having a higher latency.

15. A computer program product comprising a computer readable storage medium having program instructions embodied therewith, the program instructions executable by a processor to cause the processor to perform operations comprising:

analyzing a source code of a program to identify each data structure that will be accessed by the program during execution of the program;

determining a predicted access pattern for each data structure;

determining a type of each data structure;

calculating a data access score for each data structure based at least in part on the predicted access pattern and the type;

creating an executable code of the program based on the source code, wherein the executable code includes a memory allocation value for each data structure, and wherein the memory allocation value for each data structure is determined based on the data access score for each data structure, and wherein the memory allocation value is utilized by a processor to determine a memory location for allocating memory requested during execution of the program.

16. The computer program product of claim 15, wherein the memory allocation value indicates a memory location for storing the data structure during execution of the executable code.

17. The computer program product of claim 15, wherein the operations further comprise determining a predicted size for each data structure and wherein the data access score for each data structure is further based on the predicted size for each data structure.

18. The computer program product of claim 15, wherein the operations further comprise:

based on identifying a request for a memory allocation for a first data structure during execution the executable code:
  obtaining the memory allocation value for the first data structure;
  identifying a plurality of potential storage locations for the first data structure;
  identifying a latency score of each of the plurality of potential storage locations; and
  allocating one of the plurality of potential storage locations for the first data structure, wherein the one of the plurality of potential storage locations is determined based on the memory allocation value for the first data structure and the latency score of the one of the plurality of potential storage locations.

19. The computer program product of claim 18, wherein the one of the plurality of potential storage locations is further determined based on an available storage capacity of a memory device associated with each of the plurality of potential storage locations.

20. The computer program product of claim 18, wherein the one of the plurality of potential storage locations is further determined based on a priority level associated with the executable code.

* * * * *